United States Patent Office 2,934,219
Patented Apr. 26, 1960

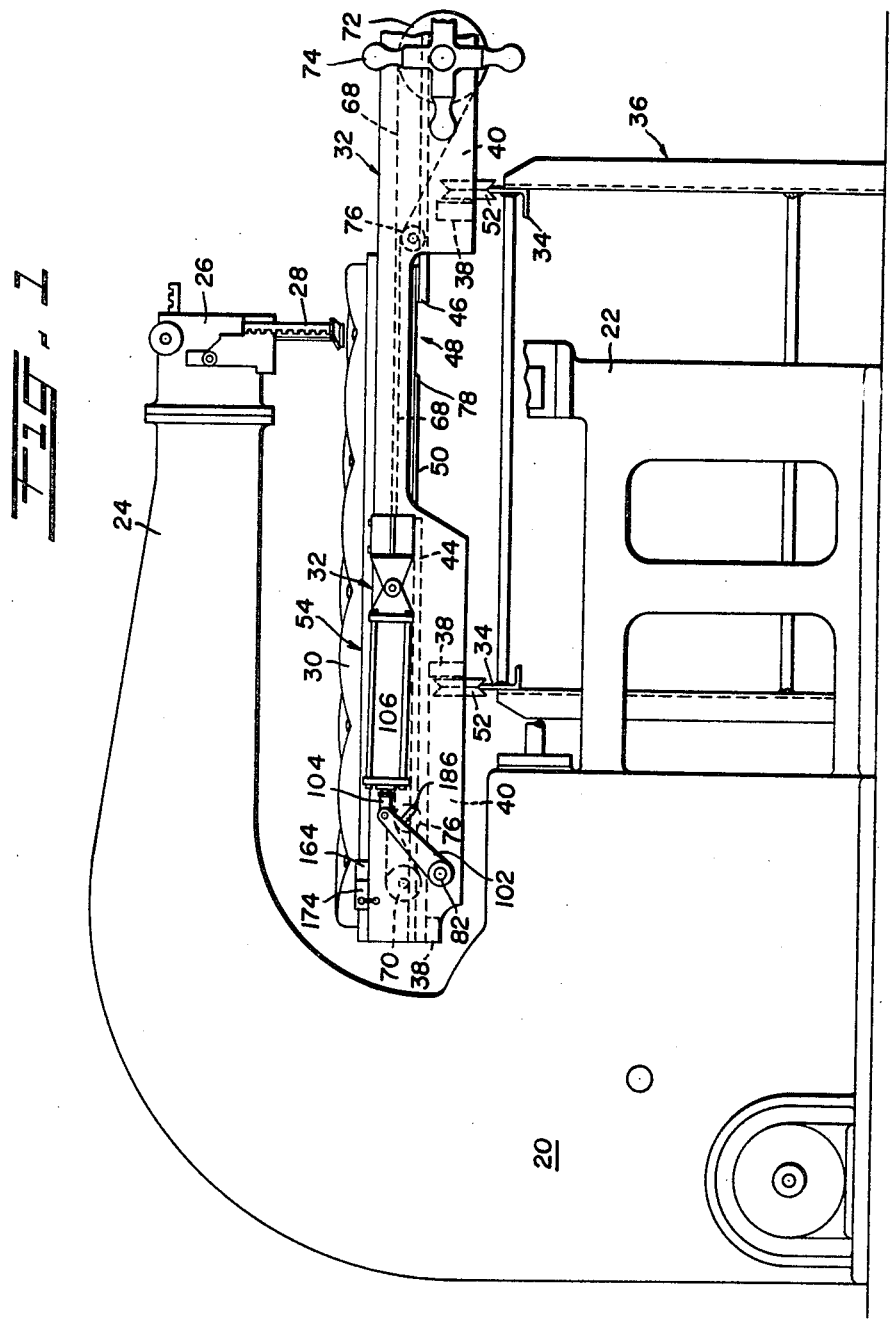

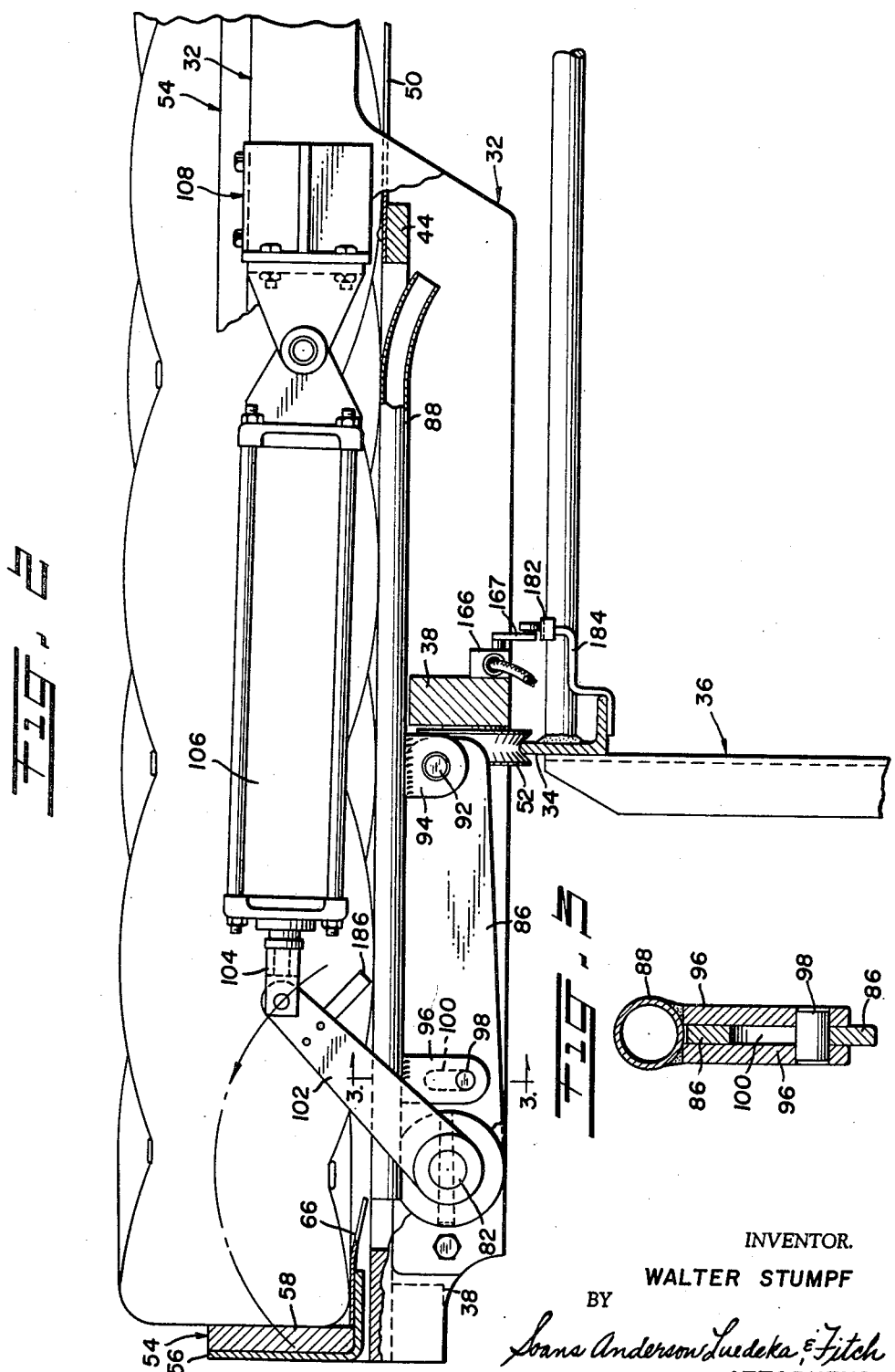

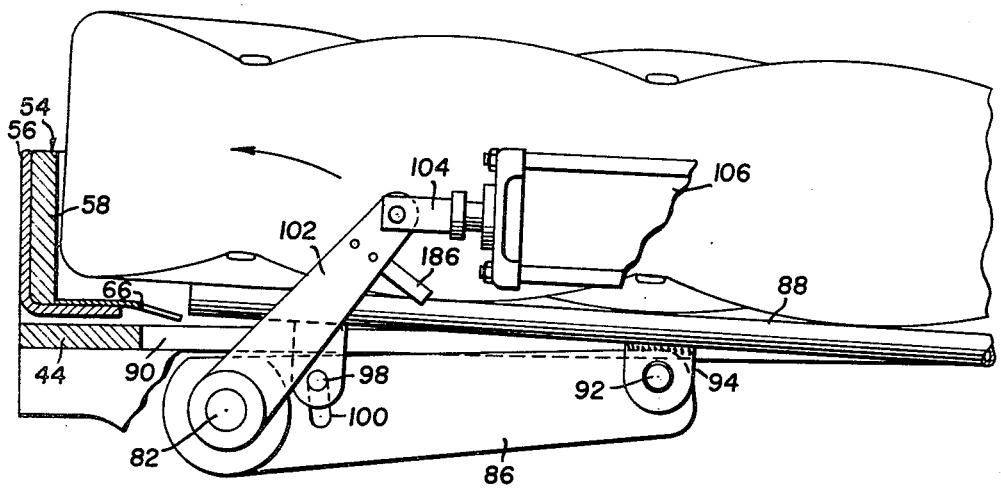
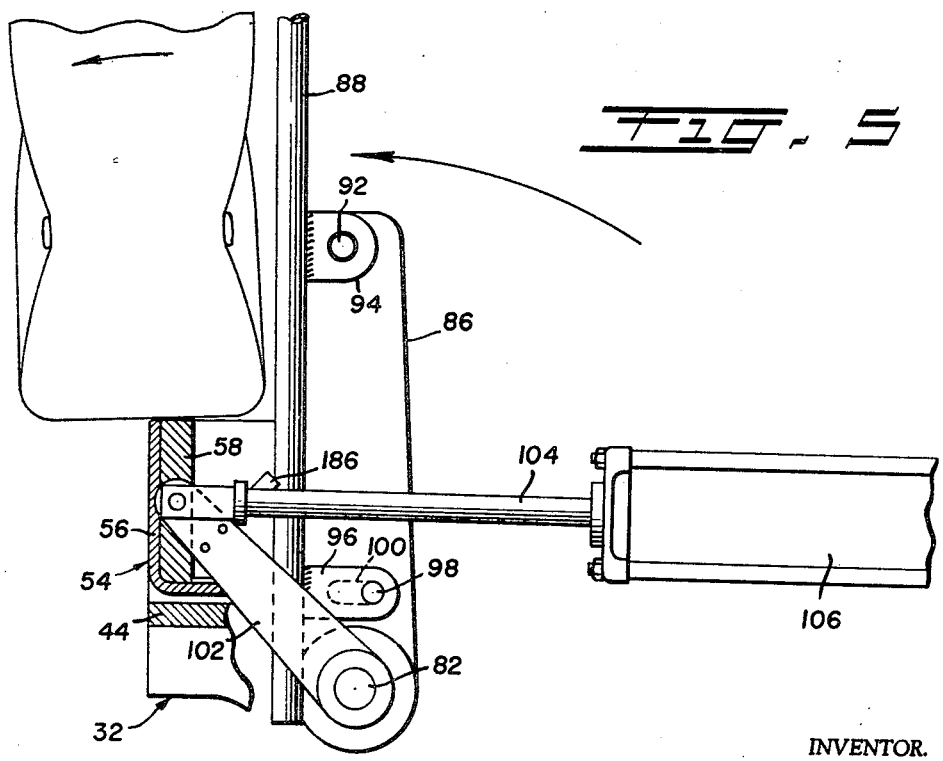

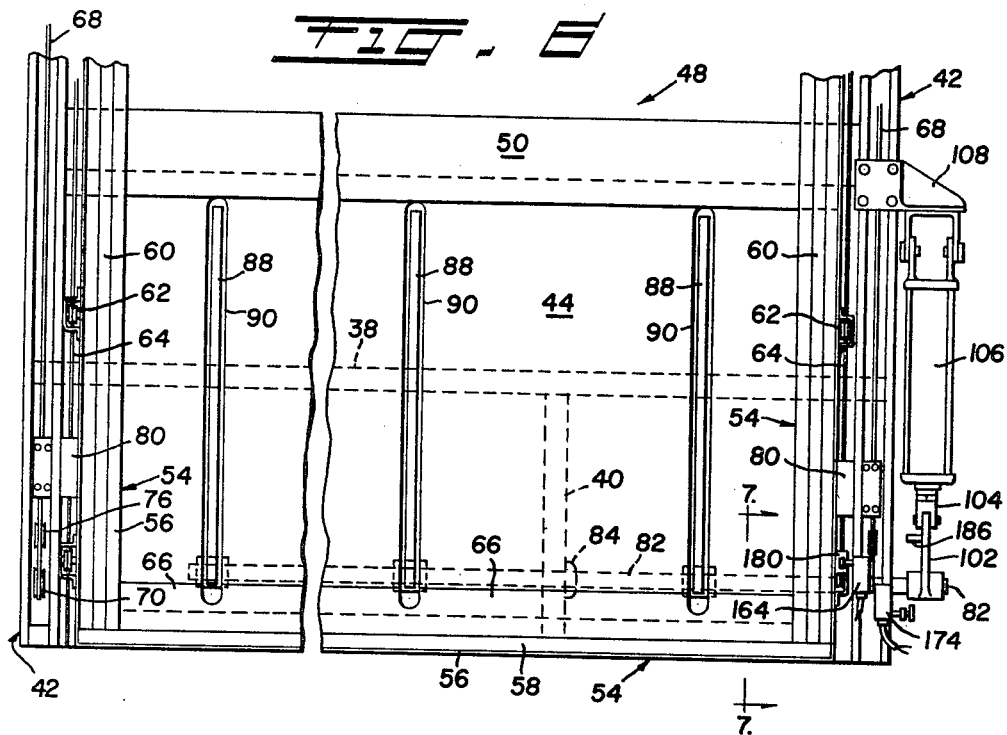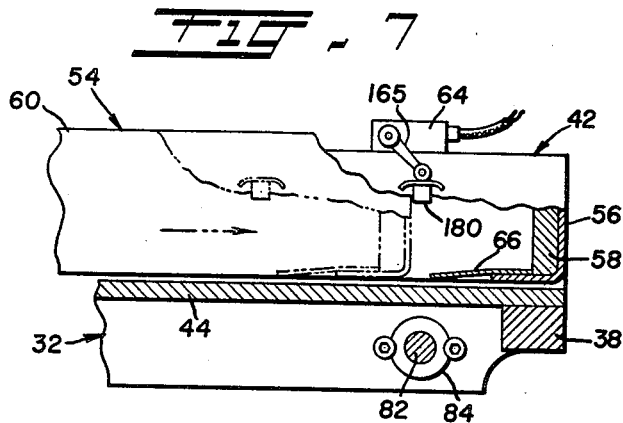

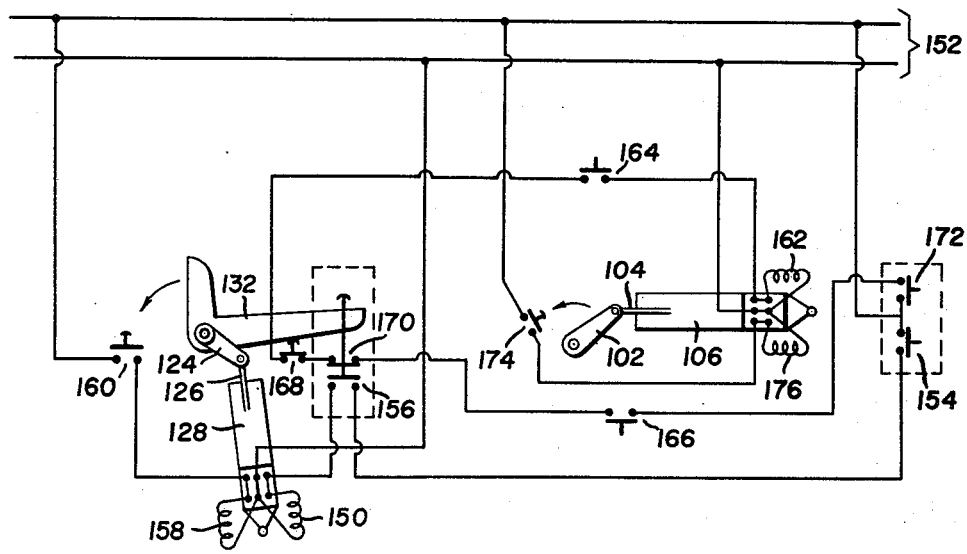

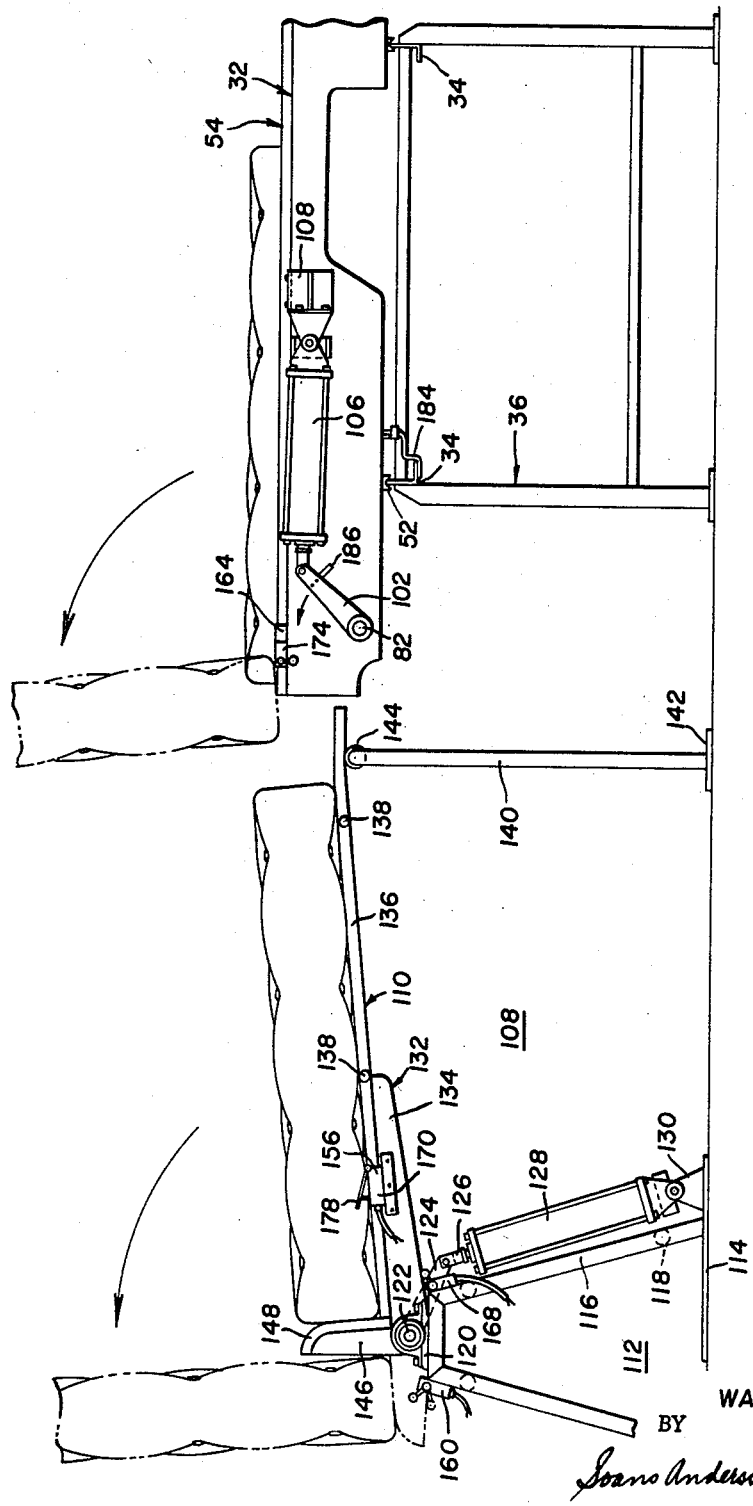

2,934,219
MATTRESS HANDLING MECHANISM

Walter Stumpf, Kenosha, Wis., assignor to Simmons Company, New York, N.Y., a corporation of Delaware Application August 15, 1958, Serial No. 755,216

8 Claims. (Cl. 214—1)

This invention relates generally to mechanical handling devices for mattresses, and more particularly to mechanism for discharging a mattress from the work surface of a machine, and transferring it to a remote point. The invention was conceived and is herein illustrated for cooperation with a mattress tufting machine, but may have applicability in other mattress manufacturing operations.

In many operations in the manufacture of mattresses, the mattress structure is supported flat upon a table or other work surface to and from which the component parts, and eventually the completed mattress, are usually transferred manually. As the manufacture proceeds, the mattress structure becomes progressively heavier, and because of its bulk, more difficult to handle, the physical handling, in some operations, requiring the attention of two persons.

Accordingly, it is the object of this invention to facilitate the manufacture of mattresses by providing mechanism for ejecting mattresses from work surfaces, and transferring them to other stations for subsequent operations. A more particular object of the invention is the mechanization of mattress handling in connection with the machine tufting of mattresses.

Other objects and advantages of the invention will become apparent from the following description and the accompanying drawings in which:

Figure 1 is an elevational view of a mattress tufting machine showing, in association therewith, a portion of the handling mechanism of the invention;

Figure 2 is an enlarged fragmentary view of the carriage or table of the tufting machine shown in Fig. 1, with portions cut away to show the underlying parts;

Figure 3 is an enlarged sectional view taken along the line 3—3 of Fig. 2;

Figures 4 and 5 are fragmentary views similar to Fig. 2 and showing the ejector mechanism of the invention in various stages of its operation;

Figure 6 is a fragmentary plan view of the mattress carriage and mechanism shown in Fig. 1;

Figure 7 is a fragmentary sectional view taken on line 7—7 of Fig. 6;

Figure 8 is an electrical circuit diagram schematically showing a preferred arrangement of electrical controls for the handling mechanism of the invention; and Figure 9 is a more inclusive elevational view similar to Fig. 1 and illustrating the cooperation between the ejector and transfer devices of the mattress handling mechanism.

General

Briefly, the invention contemplates that at the conclusion of the manufacturing operations upon a mattress reposed on the work surface of a machine, such as a tufting machine, the mattress is first lifted from the surface by the ejector mechanism, which then pivots the mattress upwardly upon one of its edges or sides through a vertical position until it falls, overturned, away from the work surface.

The mattress falls in the overturned position upon a transfer device where the reverse face of the mattress, which was lowermost during the preceding operation, may be inspected. Then, by a rotary overturning motion similar to that of the discharge device, the transfer mechanism carries the mattress farther from the machine again overturning the mattress in the process, and delivers it onto a conveyor or other transport with that face uppermost which was uppermost during the preceding operation. The operations of the ejector and transfer portions of the mechanism are physically interrelated by a control system which permits only successive operation of the ejector and transfer devices, and assures that the ejector device cannot be operated to the detriment of the machine with which it is associated.

The invention is illustrated in its application to a tufting machine which is shown and described herein only to the extent necessary to explain the application of the invention.

The tufting machine (Fig. 1) comprises basically a C-shaped frame 20 including an underarm 22 having a needle mechanism, not shown, for passing a tufting twine upwardly through the mattress, an overarm 24, a button supply and knot tying mechanism 26 at the end of each arm, and a presser mechanism 28 in the overarm 24 for compressing the mattress at the location of the tuft in order to provide slack to facilitate the tying of the tufting cords to the tufting buttons by the tying mechanisms 26.

The mattress 30 being tufted lies on a tray or carriage 32 which is supported upon a pair of rails 34 for intermittent rolling movement (perpendicular to plane of Fig. 1) in a horizontal plane between the arms of the machine in order to bring successive longitudinal portions of the mattress into the working zone of the tufting needle. When a line of tufts extending longitudinally of the mattress has been completed, the mattress is shifted transversely of the carriage 32, which is then moved in the reverse direction to start a new line of tufts. These operations are repeated until the mattress is completely tufted.

The rails 34 upon which the carriage 32 is mounted are supported above the underarm 22 of the machine by means of suitable underframing 36, and extend sufficiently to either side of the machine frame so that a mattress supported on the carriage is clear of the overarm 24 of the machine in at least one of the extreme endwise positions of the carriage.

Referring particularly to Figs. 1, 2 and 6, the carriage 32 is constructed mainly of wood, and comprises an underframe consisting of longitudinally extending beam members 38 which are connected in pairs by means of short cross braces 40 which extend only between the outer pairs of longitudinal members 38 leaving a clear unobstructed span between the two inner longitudinal members. The longitudinal members 38 are secured at each end to end wall assemblies 42 each consisting of two boards secured together in parallel, spaced-apart relation. Intermediate the end wall assemblies, the underframing is decked with two panels 44 and 46 which are spaced apart to form a slot 48 extending longitudinally of the carriage in alignment with the working zone of the machine in order to permit the passage of the machine needle upwardly through the carriage. As indicated in the drawings, the panel edges which define the aforementioned slot 48 may be provided with a metal wear-plate 50 to protect the edge of the slot from the constant wearing occasioned by the shifting of the mattress transversely of the carriage.

The carriage is supported on the rails by means of suitably grooved wheels 52 which are journaled on the longitudinal members 38 of the underframing.

Mounted on the deck of the carriage for movement transversely thereof, is a mattress shifting rack 54 which comprises a rectangular border frame 56 of angle iron, the legs of which extend inwardly and upwardly, as shown in Figs. 2 and 4. The left hand side of the frame, as seen in those views, is lined with a wooden board 58 which is suitably finished to protect the ticking of the mattress, and similar liners 60 are provided at each end of the frame to accommodate the mattress snugly therebetween. The frame 56 is movably supported slightly above the level of the deck of the carriage by means of grooved rollers 62 journaled in brackets secured to the ends of the frame and riding on rails 64 on the deck of the carriage (Fig. 6).

The bottom edges of the mattress rest upon the lower, inwardly-extending flanges of the peripheral frame 56, the side portions of which (Figs. 2 and 4) are provided with a downwardly sloped plate 66 of sheet metal or the like to facilitate the loading of the mattress into the rack 54 by sliding it on the deck of the carriage from the front or opposite side of the carriage. It will be understood that the mattress shifting rack 54 supports only the periphery of the mattress, the main body of which rests upon the deck of the carriage, and is slid across the deck by the shifting rack, as needed, to index the mattress on the carriage for successive lines of tufting.

The shifting rack 54, and the mattress with it, is moved transversely of the carriage by mechanism indicated more or less diagrammatically in Fig. 1, and in part in Fig. 6. In each wall assembly 42 of the carriage, between the two spaced boards thereof, an endless cable 68 is stretched between two pulleys 70 and 72, of which the pulley 72, at the right hand side of Fig. 1, is provided with a hand wheel 74. Idler pulleys 76 elevate the lower run of the cable 68 above the deck level of the carriage and above a cut-out 78 which is made in the end wall assembly 42 to provide clearance for the lower knotter and needle mechanism of the machine as the carriage is shifted longitudinally between the arms 22 and 24 of the machine frame. At each of its ends, the mattress shifting rack 54 is provided with a bracket 80 (Fig. 6) which passes through a slot in the inner one of the two boards of the end wall assembly 42, and is clamped to the upper run of the cable 68. The cable systems at opposite ends of the carriage are coordinated by a shaft (not shown) extending lengthwise of the carriage between the two front pulleys 72 so that as the hand wheel 74 is turned (there may be a hand wheel at either end of the carriage) the matress is shifted transversely of the carriage.

The ejector

The ejector device, which comprises a portion of the handling mechanism of the invention, is carried on the mattress carriage. Referring particularly to Figs. 6, and 2 to 5 inclusive, the ejector mechanism comprises a shaft 82 which extends longitudinally of the carriage beneath the deck thereof and through the end wall assembly 42 at the near end of the carriage, as seen in the end views. The shaft is journaled in bearings 84 which are secured respectively to the cross members 40 of the underframing at the back side of the carriage, and to the end wall assembly 42. A series of arms 86, shown as three in number, each of which is keyed to the shaft 82 by means of suitable pins, normally extend from the shaft inwardly of the carriage, that is, toward its front side, beneath and approximately parallel with the carriage deck. Each arm 86 also supports a floating lifting bar 88 (see particularly Figs. 2 and 3) which is approximately twice the length of the arm 86 and has its inner end disposed approximately over the shaft. Each lifting bar 88 is normally recessed in a slot 90 in the carriage deck, with its upper edge approximately flush with the deck. The lifting bars are of tubular construction, and are down- turned slightly at their outer ends to prevent gouging of the mattress ticking in the ejecting action still to be described.

Each lifting bar 88 is pivoted to the outer end of one of the arms 86 by means of a pin 92 which passes freely through a hole in the arm and is secured at its ends in lugs 94 which flank the ends of the arm 86 and are welded to the underside of the lifting bar. A similar pair of lugs 96 welded to the underside of the lifting bar 88 adjacent its inner end near the shaft, and flanking the lifting arm 86, are spanned by a pin 98 which passed through a short slot 100 cut in the lifting arm 86 on an arc around the center of the lifting bar pivot 92. Thus in the composite structure of the lifting arm 86 and lifting bar 88, the slot 100 provides a delayed or lost motion action, the purpose of which will subsequently be made clear.

To the end of the shaft 82 which lies outwardly of the end wall assembly 42 of the carriage, there is pinned a crank arm 102, the outer end of which is pivoted to the piston rod 104 of a cylinder 106 which extends generally transversely of the carriage along the end wall thereof, at the near side as seen in each of the elevational views. At its base end, the cylinder 106 is pivoted to a bracket 108 which is secured by means of bolts to the end wall assembly 42 of the carriage. In the illustrated case, the cylinder is a double acting cylinder operated by compressed air, but if it were preferred, the cylinder might be operated hydraulically or replaced by other quick-action drive means.

As indicated in Figs. 2, 4 and 5, when the air cylinder 106 is actuated to extend the piston rod 104, the crank arm 102 is turned counterclockwise. The resulting initial movement of the shaft 82 raises the outer end of the lifting arm 86, but due to the weight of the mattress, the center of gravity of which is located outwardly of the lifting bar pivot 92, the outer end of the lifting bar 88 remains substantially in place. At the same time, the inner end of the lifting bar 88 rises rapidly (Fig. 4) until the slack in the lost motion connection is taken up, i.e., until the pin 98 reaches the top of the slot 100 in the lifting arm 86. The amount of lost motion desired is such as to elevate the inner end of the mattress sufficiently to place the mid-point of its side wall at or above the level of the upper edge of the mattress shifting rack 54. Thereafter, the arm 86 and the lifting bar 88 swing in unison, causing the mattress to pivot upwardly about its inner edge, which is held by the edge of the mattress shifting rack 54. At the same time the mattress shifts relatively outwardly along the lifting bar.

As the momentum of the mattress carries the center of gravity outwardly of the edge of the mattress shifting rack 54 (Fig. 5) its pivoting movement continues, aided by gravity, and the mattress, overturned, falls away from the carriage of the machine. The abrupt stopping of the lifting arm 86 in the upright position (Fig. 5) restores the lifting bar 88 and lifting arm 86 to their initial relationship, and the piston rod 104, suitably activated for movement in the reverse direction by means still to be described, returns the lifting bar 88 to the normal position shown in Fig. 2.

The transfer device

To facilitate the inspection of the mattress and also to permit the immediate unloading of the mattress table, regardless of whether there is space immediately available on the conveyor or other transport to which the mattress is ultimately delivered from the tufting machine, there is provided a transfer device 108, which is shown in Fig. 9. As there indicated, the transfer device 108 is located immediately adjacent the end or ejection position of the carriage 32 of the tufting machine, and receives the mattress in the overturned condition as it falls away from the carriage of the machine.

The transfer device consists essentially in a tray or table 110 suitably positioned to receive the mattress from the carriage of the tufting machine, and is adapted to be rotated about one of its side edges to deliver the mattress by a similar overturning movement to a more remote point. For example, a conveyer, not shown, may be visualized as travelling perpendicularly to the plane of Fig. 9 just outside the left hand boundary thereof so as to receive the mattress as it falls away from the broken line position indicated at the left hand side of Fig. 9.

Specifically, the transfer device includes an under structure 112 consisting of a base plate 114 having mounted in line thereon a series of trapezoidal standards 116 of angle iron or the like, connected together and braced in upstanding position by tubular cross rails 118 welded to the standards. On the upper cross piece of each standard there is secured a bearing 120, which together with like bearings on each standard, serves to journal a single shaft 122 which extends the length of the transfer device. At one end of the shaft 122, as seen in Fig. 9, there is secured a crank arm 124, the outer end of which is pivoted to the piston rod 126 of a double acting air cylinder 128, which may be identical with the cylinder 106 employed on the carriage 32 of the tufting machine. The base end of the cylinder 128 is pivoted to a bracket 130 secured to the base plate 114 of the underframing so that when the cylinder is actuated, the crank arm 124 and shaft 122 are rotated through an arc of movement of approximately 90°, as indicated in the drawing.

To the aforementioned shaft 122 there are secured in any suitable manner a plurality of lifting arms 132 which are L-shaped, the two arm portions thereof being disposed at right angles to each other. Each arm may be conveniently fabricated as an integral piece by flame cutting from steel plate, and all are secured to the shaft with the longer portions 134 thereof extending toward the carriage of the tufting machine at a slight upward angle when in the normal position. Secured to the longer arm portions 134 there is the table structure 110 upon which the mattress directly rests, and which may, as illustrated, consist merely of a tubular framework having transverse members 136 which are preferably aligned with the lifting arms 132 and secured directly thereto, and are connected together by suitable cross members 138. To firmly support the outer end of the table in receiving position, there is provided a standard 140 which may consist of an inverted U-shaped frame of pipe or the like, the legs of which are provided at their lower ends with bolting pads or flanges 142 with which to secure the standard to the factory floor. The upper cross bar of the standard is preferably padded, as for example, by being sheathed in rubber hose 144 or similar material.

Secured to the upwardly extending portions 146 of the lifting arms 132 is an abutment wall 148 which may consist, for example, of a single length of sheet metal which is rounded back at its top edge and at its ends to provide continuous smooth contact with the mattress in all stages of operation.

As will be appreciated by comparing the solid- and broken-line positions of transfer device in Fig. 9, its operation consists in a simple turning movement which delivers the mattress from an approximately horizontal starting position to an upstanding position on one of its side edges, from which its momentum acquired in the lifting action, aided by gravity, causes the mattress to fall away onto an appropriately positioned receiving device, such as the conveyer heretofore suggested, or a suitable vehicle.

The double turning of the mattress by the successive actions of the ejector on the tufting machine carriage, and of the transfer device, delivers the mattress from the transfer device 108 in the condition in which it was placed on the tufting machine in the first instance. The double turnover facilitates the inspection of both faces of the mattress for the results of the tufting operation, and at the same time provides a temporary holding station which permits the immediate unloading of the tufting machine carriage at the conclusion of the tufting operation regardless of whether the tufted mattress may be moved immediately into the conveyer system.

*Control*

It may be apparent from the foregoing description of operation, particularly that of the ejector or discharge device on the tufting machine, that the system desirably includes suitable assurances that the mattress carriage is clear of the overarm of the tufting machine, and that the shifting rack 54 is properly positioned thereon, before the ejector mechanism is actuated, and also, that the transfer device is in proper position to receive the mattress. This coordination and the means for initiating the action both of the ejector mechanism and the transfer mechanism are accomplished electrically by a circuit arrangement shown diagrammatically in Fig. 8.

Each of the double acting cylinders 106 and 128 is connected to a source of pressure air through a two-position valve which is selectively positionable by means of solenoids to admit pressure air to either side of the piston, and to open the other side simultaneously to the atmosphere.

The solenoid 150 of the cylinder 128 which actuates the transfer mechanism 108, and which, when energized operates the valve to admit pressure air to extend the piston rod 126 from the cylinder, is connected to a suitable power source 152 through two series-connected, normally-open switches, one a manually-operated push-button switch 154 and the other switch 156 positioned to be closed by the weight of a mattress resting on the transfer table 110. The purpose of the latter is to insure that the transfer table will not be operated unless it carries a mattress, and hence affords a measure of protection for operating and maintenance personnel. The other solenoid 158 of the cylinder 128, which is energized to position the valve to admit pressure air to the opposite side of the piston to return the transfer table to mattress-receiving position, is connected to power through a normally-open reversing switch 160 which is closed momentarily by the transfer device 108 when it reaches the extreme upper position indicated by the broken lines in Fig. 9. Thus, the complete cycle of operation of the transfer table is automatic once initiated by the momentary closing by the push button switch 154.

The foregoing control arrangement assumes that it will be desirable in most cases to initiate operation of the transfer table 110 manually, but the arrangement is also adaptable to automatic initiation of the operation by substituting for the manual push button switch 154 an automatic switch for sensing any condition selected as suitable for initiating the operation of the transfer table. For example, in the arrangement previously suggested wherein the transfer table is located adjacent a conveyer to which it delivers the mattress, a suitable light source and photo-electric relay could be substituted for the push button switch 154, and arranged in such a way as to close the circuit to the solenoid 150 whenever the space available on the conveyer were great enough to receive a mattress from the transfer table. In such an arrangement the initiation of the operation of the transfer table might occur immediately upon receipt of a mattress from the tufting machine, or it might be delayed, depending upon whether the mattress-operated switch 156 or the switch substituted for the push-button switch 154 were closed last, i.e., depending upon whether space were immediately available on the conveyer at the time the transfer table received the mattress from the ejector mechanism of the tufting machine.

The solenoid 162 of the cylinder 106 which actuates the ejector mechanism, and which when energized operates the cylinder valve to admit pressure air to extend the piston rod 104, is connected to power through five series-connected switches, four of which are normally open, and one of which is normally closed. Two of the normally-open switches, 164 and 166, are carried by the movable carriage 32 of the tufting machine and are closed only when the mattress carriage is clear of the overarm 24 of the tufting machine, and when the mattress shifting rack 54 on the carriage 32 is suitably positioned to permit the lifting bars 88 of the ejector mechanism to pass freely upwardly through the open area encompassed by the rack. A third normally open switch 168 is carried by the transfer device 108 and is closed only when the transfer table is in the mattress-receiving position indicated by the solid lines of Fig. 9. The normally closed switch 170 is likewise carried by the transfer device and is closed only when the transfer table 110 is unoccupied, i.e., does not already have thereon a mattress. The purpose of the latter switch, of course, is to prevent the loading of more than one mattress onto the transfer table by the ejector mechanism at any one time. The fifth and normally open switch in the circuit is a manually-operated push-button switch 172, which is effective to close the circuit to the solenoid 162 to admit pressure air to operate the ejector if all the other switches are closed, i.e., if the carriage 32 is clear of the overarm 24 of the machine, and the shifting rack 54 properly positioned thereon, and if the transfer table 110 is empty and in position to receive a mattress from the tufting machine.

Still referring to the circuit diagram of Fig. 8, the automatic reversing of the ejector mechanism is accomplished in a manner substantially identical with that already described in connection with the transfer table 110. Specifically, when the ejector mechanism reaches the upright position shown in Fig. 5, it closes a normally-open switch 174 which applies power to the other solenoid 176 of the two position valve to apply pressure air to the reverse side of the piston of the cylinder 106, which affects the retraction of the piston rod 104 and the return of the ejector mechanism to its normal position.

The physical location of the aforementioned switches is indicated in various of the drawings. Referring first to those which are related to the operation of the transfer table 110 (Fig. 9), the mattress sensing switch 156 may be mounted on one of the arms 132 of the transfer table, and may have as its operator a spring-biased sensing leaf 178 which is pivoted to the switch housing and normally protrudes above the supporting level of the transfer table. When a mattress is placed on a table, the sensing leaf 178 is depressed, pushing down a plunger to operate the switch. The switch 156 may be incorporated as one element of a double pole, double throw switch, the other and normally closed element of which is the switch 170 of the control circuit for the ejector mechanism.

The reversing switch 160 may be of the rotary arm type having its arm spring-urged into a position to be operated by the shorter portion 146 of the transfer table support arm 132 as indicated in Fig. 9, when the transfer table 110 reaches the upright position. The push-button switch 154 may be combined in a single housing with the push-button switch 172 controlling the ejector mechanism, and placed at any convenient location, (not shown) as for example, at the front or far right of the tufting machine carriage 32 as seen in Fig. 1, or any other place conveniently accessible to the machine operator.

The various switches controlling the operation of the ejector mechanism are carried in part on the carriage 32 of the tufting machine and in part on the transfer mechanism 108. The switch 164 which senses the proper position of the mattress-shifting rack 54 on the carriage 32 is located as shown generally in Fig. 6, and its manner of operation is more particularly shown in Fig. 7. The switch 164 is likewise of the rotary arm type and is mounted on the end-wall assembly 42 of the carriage 32, with its arm 165 disposed for camming engagement with a switch operator 180 secured to the adjacent end of the mattress shifting rack. The operator 180 consists of an angle bracket, the vertical face of which is bolted to the end of the mattress shifting rack 54 and the horizontal face of which is positioned to strike the end of the switch arm 165 and to rotate the arm as the rack is moved fully to the rear of the carriage 32 as shown in Fig. 6. The ends of the horizontal face of the switch operator 180 are preferably turned down to facilitate the smooth camming operation of the switch arm 165.

As indicated in Fig. 2, the normally-open switch 166, which is closed only when the mattress carriage is clear of the overarm 24 of the tufting machine, is carried on the underside of the carriage 32, where it is secured to one of the longitudinal frame members 38 of the carriage. The switch 166 is also of the rotary arm type, the arm 167 being turned, when the carriage 32 is properly positioned, by camming engagement with the curved cap 182 of a bracket 184 which is secured to one of the rails 34 which support the carriage. The bracket 184 is positioned on the rail 34 to cause engagement between the operating arm 167 of the switch and the cap 182 when the carriage 32 is at the extreme end of its track and aligned with the transfer table 110.

The arrangement of the switch and the switch operator in the case of the two switches 164 and 166 is substantially identical, with the exception that in the case of the switch 164, the switch is fixed and the operator 180 movable, whereas in the case of the switch 166, the switch operator 182 is fixed and the switch movable relative thereto.

The normally open switch 168, which is closed only when the transfer table 110 is in mattress-receiving position, is preferably mounted on one of the standards 116 of the transfer device 108 and may similarly be of the rotary arm type, the arm being positioned for engagement with the longer portion 134 of the supporting arm 132, so that when the transfer table is in mattress-receiving position, the arm of the switch 168 is engaged, and the switch is closed. The normally closed switch 170, which senses the presence of a mattress on the transfer table 110, is one element of the double-pole, double-throw switch mounted on the supporting underarm 132 of the transfer table 110, as previously indicated.

The reversing switch 174 for the ejector mechanism may likewise be of the rotary arm type and is mounted on the end-wall assembly 42 of the mattress carriage 32, adjacent the path of movement of the crank arm 102. To effect the operation of the reversing switch, the crank arm 102 is provided with a sidewardly extending switch operating bracket 186 disposed to engage the arm of the switch 174 when the ejector mechanism reaches the upright position, as may be appreciated from examination of Figs. 6 and 9. The push button switch 172 for initiating the operation of the ejector, as previously indicated, is preferably incorporated into a common housing with the push-button switch 154 employed to initiate the operation of the transfer table, and located at any convenient station within reach of the machine operator.

The foregoing arrangement, in addition to protecting the machine parts by permitting operation of the ejector only when the carriage and mattress shifting rack are properly positioned, also assures that the ejector and transfer mechanisms are normally operable only in succession.

*Summary*

By the use of the handling mechanism heretofore described, the manufacturing facilities with which it is utilized can be employed to fuller capacity by reducing the time of the operators formerly consumed in the physical handling necessary to the unloading of the machine. Moreover, the fatigue heretofore associated with such operations is greatly reduced.

These advantages are obtained by the use of a simple and rugged ejector mechanism, which, by reason of its compount movement, is especially adapted to lift the mattress from the confines of a positioning or feeding device in the act of ejecting it from the machine. The employment of a transfer table in connection with the ejector facilitates inspection of the results of the manufacturing operations, and provides a temporary holding station in the event the subsequent conveyng or transport facilities are not immediately available. The ejector mechanism and the transfer table are coordinated in their control and operaton by suitable control mechanism which insures that one is always properly conditioned for the operation of the other, and that the operation of the ejector mechanism will occur without damage to the machine with which it is employed.

The features of the invention believed new and patentable are set forth in the appended claims.

I claim:

1. Mechanism for ejecting a mattress from a work surface over a barrier along one side thereof comprising lifting means associated with said surface and extending beneath said mattress to support said mattress from its underside, actuating means normally disposed beneath said work surface and connected to said lifting means for first elevating said lifting means to raise the side of the mattress adjacent said barrier and then rotating said lifting means into an upright position about an axis disposed beneath said work surface along said one side and inwardly of said barrier thereby to rotate the mattress upwardly about said barrier, and power-operated driving means connected to operate said actuating means.

2. Mechanism for ejecting a mattress from a work surface over a barrier along one side thereof comprising a shaft rotatably mounted beneath said surface along said one side and inwardly of said barrier, a plurality of arms secured to said shaft and extending inwardly therefrom beneath said surface, recesses in said surface for the passing of said arms upwardly therethrough, lifting means extending beneath a mattress on said surface and engageable with the underside of the mattress to support the same in the ejecting action, said lifting means being pivoted on said arms on an axis parallel to said shaft and having limited rotation relative thereto in a direction counter to the direction of rotaton of said shaft and arms in the ejecting action, whereby the upward rotation of said shaft and arms in the ejection of the mattress initially raises the edge of said mattress adjacent said barrier and then rotates said mattress upwardly about said barrier as an axis, and power-operated means for rotating said shaft to rock said lifting means to an upright position.

3. Mechanism for discharging a mattress from a work surface over a barrier along one side thereof comprising a shaft rotatably mounted beneath said surface along said one side and inwardly of said barrier, a plurality of arms secured to said shaft, a lifting bar pivoted to the end of each said arm on an axis parallel to said shaft and normally disposed in a recess in said work surface and engageable with the underside of a mattress supported thereon, said lifting bar extending generally perpendicularly to said shaft and being elongated in both directions from said pivot so as to extend from said shaft inwardly of the work surface to a point beyond the center line of a mattress reposed on said surface, said lifting bar having limited rotation on said arm whereby the initial rotation of said shaft in the ejection of the mattress from said work surface raises the inner end of said lfting bar from said recess to elevate the edge of the mattress adjacent said barrier, and then rotates said lifting bars upwardly as a unit with said arms, and power-operated means for rotating said shaft to elevate said lifting bars from said work surface to an upright position.

4. In a mattress tufting machine having a carriage movable thereon in one direction for carrying a mattress into and out of the working zone of the machine and an open mattress shifting rack movable on the deck of said carriage in a transverse direction for shifting said mattress sidewardly thereon, and having barriers at its sides for snugly retaining a mattress therein, a mattress ejecting mechanism comprising a shaft rotatably mounted on said carriage beneath the deck thereof, and adjacent one side of said carriage, a plurality of arms secured to said shaft and normally extending inwardly therefrom beneath said deck, recesses in said deck to permit the passage therethrough of said arms upon rotation of said shaft, lifting means on said arms for engaging the underside of a mattress on said deck to rock said mattress upwardly about one of its edges when said shaft and arms are rotated, power-operated means connected to said shaft for rotating said shaft to rock said mattress into an upright position on said one edge, and control means for said power-operated means including interengageable means on said carriage and shifting rack, and on said carriage and a portion of said machine with respect to which said carriage is movable for disabling said power-operated means when the mattress is in the working zone of said machine or improperly positioned relative to said lifting means.

5. In a mattress tufting machine having a carriage movable thereon in one direction for carrying a mattress into and out of the working zone of the machine and an open mattress shifting rack movable on the deck of said carriage in a transverse direction for shifting said mattress sidewardly thereon, and having barriers at its sides for snugly retaining a mattress therein, a mattress ejecting mechanism comprising a shaft rotatably mounted on said carriage beneath the deck thereof and adjacent one side of said carriage, a plurality of arms secured to said shaft and normally extending inwardly therefrom beneath said deck, recesses in said deck to permit the passage therethrough of said arms upon rotation of said shaft, lifting means on said arms for engaging the underside of a mattress on said deck to rock said mattress upwardly about one of its edges when said shaft and arms are rotated, power-operated means connected to said shaft for rotating said shaft to rock said mattress into an upright position on said one edge, and electrical control means for said power-operated means including separate switches carried on said carriage and responsive respectively to the position of said rack thereon and to the position of said carriage on the machine for permitting energization of said power-operated means only when said mattress is clear of the working zone of the machine and properly positioned over said lifting means, a manually operated switch for initiating the energization of said power-operated means through said first-mentioned switches, and a fourth switch actuated by the power-operated means when said mattress is at said upright position to reverse the application of power thereto to restore the ejecting mechanism to its normal position.

6. A mattress handling mechanism for transferring a mattress from a work surface to a remote point comprising a rotary ejection device associated with said surface and comprising lifting means engageable with the underside of a mattress thereon and rotatable about an axis along one side of said surface for rocking said mattress upwardly therefrom about one of its edges, power-operated means for rotating said lifting means to rock said mattress through a vertical position about said one edge, a transfer table adjacent said work surface for receiving the overturned mattress as it falls from said work surface, said transfer table being rotatable about an axis at one of its sides so as to again rotate said mattress about another one of its edges in a second overturning movement to carry said mattress farther from said work surface, power-operated means for rotating said transfer table to rock said mattress through a vertical position about said second-mentioned edge to fall from said transfer table, and electrical control means for controlling the application of power to each said power-operated means including a circuit adapted when closed to apply power to said first-mentioned power-operated means to rotate said lifting means, and switch means in said circuit responsive to the presence of a mattress on said transfer table and to the position of said transfer table for preventing the closing of said circuit when a mattress is on said table or when said transfer table is in operation.

7. A mattress handling mechanism for transferring a mattress from a work surface to a remote point comprising a rotary ejection device associated with said surface and comprising lifting means engageable with the underside of a mattress thereon and rotatable about an axis along one side of said surface for rocking said mattress upwardly therefrom about one of its edges, power-operated means for rotating said lifting means to rock said mattress through a vertical position about said one edge, a transfer table adjacent said work surface for receiving the overturned mattress as it falls from said work surface, said transfer table being rotatable about an axis at one of its sides so as to again rotate said mattress about another one of its edges in a second overturning movement to carry said mattress farther from said work surface, power-operated means for rotating said transfer table to propel said mattress through a vertical position about said second-mentioned edge to fall from said transfer table, and electrical control means for controlling the application of power to each said power-operated means including a first circuit adapted when closed to apply power to said first-mentioned power operated means to rotate said lifting means, and switch means in said circuit responsive to the presence of a mattress on said transfer table and to the position of said transfer table for preventing the closing of said circuit when a mattress is on said table or when said transfer table is in operation, and a second circuit adapted when closed to apply power to said second-mentioned power-operated means to rotate said transfer table, and switch means in said second circuit responsive to the presence of a mattress on said transfer table for preventing the closing of said second circuit in the absence of a mattress on said transfer table.

8. A mattress handling mechanism for transferring a mattress from a work surface to a remote point comprising a rotary ejection device associated with said surface and comprising lifting means engageable with the underside of a mattress thereon and rotatable about an axis along one side of said surface for rocking said mattress upwardly therefrom about one of its edges, power-operated means for rotating said lifting means to propel said mattress through a vertical position about said one edge, a transfer table adjacent said work surface for receiving the overturned mattress as it falls from said work surface, said transfer table being rotatable about an axis at one of its sides so as to again rotate said mattress about another one of its edges in a second overturning movement to carry said mattress farther from said work surface, power-operated means for rotating said transfer table to propel said mattress through a vertical position about said second-mentioned edge to fall from said transfer table, and electrical control means for applying power only in succession to said power-operated means.

References Cited in the file of this patent
UNITED STATES PATENTS
1,644,386    Kendall _____ Oct. 4, 1927